US010010485B2

(12) United States Patent
Takahama et al.

(10) Patent No.: US 10,010,485 B2
(45) Date of Patent: Jul. 3, 2018

(54) MEDICINE FEEDING UNIT

(71) Applicant: Takazono Technology Incorporated, Hirakata-shi (JP)

(72) Inventors: Makio Takahama, Hirakata (JP); Kenzo Yoshinori, Hirakata (JP)

(73) Assignee: Takazono Technology Incorporated, Osaka (JP)

( * ) Notice: Subject to any disclaimer, the term of this patent is extended or adjusted under 35 U.S.C. 154(b) by 0 days.

(21) Appl. No.: 14/917,680

(22) PCT Filed: Sep. 17, 2014

(86) PCT No.: PCT/JP2014/074502

§ 371 (c)(1),
(2) Date: Mar. 9, 2016

(87) PCT Pub. No.: WO2015/041230

PCT Pub. Date: Mar. 26, 2015

(65) Prior Publication Data

US 2016/0213571 A1 Jul. 28, 2016

(30) Foreign Application Priority Data

Sep. 20, 2013 (JP) ................................ 2013-195849

(51) Int. Cl.
*G06F 17/00* (2006.01)
*A61J 7/00* (2006.01)
(Continued)

(52) U.S. Cl.
CPC ............... *A61J 7/0076* (2013.01); *A61J 3/00* (2013.01); *B65B 1/30* (2013.01); *B65B 35/06* (2013.01);
(Continued)

(58) Field of Classification Search
CPC .................................................... A61J 1/1475
See application file for complete search history.

(56) References Cited

U.S. PATENT DOCUMENTS 4,479,573 A 10/1984 Ackley, Sr. et al.
5,074,824 A 12/1991 Suris
(Continued)

FOREIGN PATENT DOCUMENTS

AU 2011339288 A1 7/2013
CN 103249389 A 8/2013
(Continued)

OTHER PUBLICATIONS

Singapore Office Action re: 11201601897Q dated Dec. 27, 2016.
(Continued)

*Primary Examiner* — Timothy R Waggoner
*Assistant Examiner* — Ayodeji T Ojofeitimi
(74) *Attorney, Agent, or Firm* — The Webb Law Firm

(57) ABSTRACT

A medicine feeding unit configured to feed solid medicines, the unit including: a medicine feeder having a driven shaft and a support having a driving shaft that is connected with the driven shaft. The driven shaft has a driven shaft body and a driven engagement member. The driving shaft has a driving shaft body and a driving engagement member. The driven engagement member is biased in a direction approaching the driving engagement member. The unit further includes a rotation preventing part configured to allow the driven engagement member to rotate in a state in which the driven engagement member is engaged with the driving engagement member, and to prevent the driven engagement member from rotating in a state in which the driven engagement member abuts the driving engagement member without being engaged therewith, in a state in which the medicine feeder is mounted on the support.

4 Claims, 16 Drawing Sheets

(51) Int. Cl.

| | |
|---|---|
| ***A61J 3/00*** | (2006.01) |
| ***B65B 35/06*** | (2006.01) |
| ***B65B 1/30*** | (2006.01) |
| ***B65B 35/08*** | (2006.01) |
| ***B65B 65/02*** | (2006.01) |
| ***G07F 17/00*** | (2006.01) |
| ***B65D 83/04*** | (2006.01) |
| *B65B 5/10* | (2006.01) |
| *A61J 3/07* | (2006.01) |

(52) U.S. Cl.

CPC .............. *B65B 35/08* (2013.01); *B65B 65/02* (2013.01); *B65D 83/0409* (2013.01); *G07F 17/0092* (2013.01); *A61J 3/07* (2013.01); *B65B 5/103* (2013.01)

(56) References Cited

U.S. PATENT DOCUMENTS

| | | | | |
|---|---|---|---|---|
| 5,671,592 | A | 9/1997 | Yuyama et al. | |
| 5,865,342 | A | 2/1999 | Ito et al. | |
| 6,073,799 | A | 6/2000 | Yuyama et al. | |
| 6,170,229 | B1 | 1/2001 | Kim | |
| 7,395,946 | B2 * | 7/2008 | Yuyama .................. | G07F 11/44 221/186 |
| 9,132,060 | B2 | 9/2015 | Omura et al. | |
| 2002/0007868 | A1 * | 1/2002 | Kodama ................. | B65B 5/103 141/104 |
| 2005/0230413 | A1 | 10/2005 | Kim | |
| 2007/0116792 | A1 | 5/2007 | Yuyama et al. | |
| 2007/0129844 | A1 | 6/2007 | Kim | |
| 2008/0099499 | A1 | 5/2008 | Kim | |
| 2011/0170655 | A1 | 7/2011 | Yuyama et al. | |
| 2011/0309101 | A1 | 12/2011 | Kokie et al. | |
| 2013/0233894 | A1 | 9/2013 | Kim | |
| 2013/0267927 | A1 | 10/2013 | Omura et al. | |
| 2014/0014678 | A1 | 1/2014 | Yuyama et al. | |
| 2014/0203034 | A1 | 7/2014 | Bae et al. | |
| 2014/0203036 | A1 | 7/2014 | Bae et al. | |
| 2015/0027286 | A1 | 1/2015 | Yuyama et al. | |
| 2015/0028047 | A1 | 1/2015 | Yuyama et al. | |
| 2015/0028078 | A1 | 1/2015 | Yuyama et al. | |
| 2015/0083745 | A1 | 3/2015 | Yuyama et al. | |
| 2015/0083746 | A1 | 3/2015 | Yuyama et al. | |
| 2016/0213572 | A1 | 7/2016 | Tahahama et al. | |

FOREIGN PATENT DOCUMENTS

| | | | | |
|---|---|---|---|---|
| EP | 1676778 | A1 | 7/2006 | |
| EP | 2759286 | A2 | 7/2014 | |
| JP | 8119202 | A | 5/1996 | |
| JP | 930501 | A | 2/1997 | |
| JP | 977001 | A | 3/1997 | |
| JP | 9240603 | A | 9/1997 | |
| JP | 9323702 | A | 12/1997 | |
| JP | 10314277 | A | 12/1998 | |
| JP | 200084048 | A | 3/2000 | |
| JP | 2002179020 | A | 6/2002 | |
| JP | 2002186658 | A | 7/2002 | |
| JP | 2005104565 | A | 4/2005 | |
| JP | 2005289506 | A | 10/2005 | |
| JP | 200782622 | A | 4/2007 | |
| JP | 2007136238 | A | 6/2007 | |
| JP | 2007175523 | A | 7/2007 | |
| JP | 2007238181 | A | 9/2007 | |
| JP | 2012120719 | A | 6/2012 | |
| JP | WO2012077788 | * | 6/2012 | ................ A61J 3/00 |
| JP | 2012250070 | A | 12/2012 | |
| JP | 201391569 | A | 5/2013 | |
| KR | 101475712 | B1 | 12/2014 | |
| WO | 2005032944 | A1 | 4/2005 | |
| WO | 2010032418 | A1 | 3/2010 | |

OTHER PUBLICATIONS

Singapore Office Action re: 11201601896P dated Dec. 27, 2016.

Examination report No. 1 for standard patent application re Australian Application No. AU 2014322144 dated May 22, 2017.

Office Action dated Sep. 8, 2017 regarding related Japanese Patent Application No. 2015-537935 (including English-language translation).

* cited by examiner

MEDICINE FEEDING UNIT

CROSS-REFERENCE TO RELATED APPLICATIONS

This application is the United States national phase of International Application No. PCT/JP2014/074502 filed Sep. 17, 2014, and claims priority to Japanese Patent Application No. JP 2013-195849 filed Sep. 20, 2013, the disclosures of which are hereby incorporated in their entirety by reference.

FIELD

The present invention relates to a medicine feeding unit for solid medicines.

BACKGROUND

As a medicine feeding unit, a "medicine feeder" disclosed in Patent Literature 1, for example, can be mentioned. This medicine feeding unit is basically provided with a medicine container that contains solid medicines (which is described as a "container" in Patent Literature 1, and the terms in the parentheses in the "Background" are the names of the members according to Patent Literature 1), and a substantially cylindrical rotor that is rotatably located in the medicine container. The medicine container is detachably attached to a support (drive unit). The rotor rotates about the vertical axis. As the rotor rotates, medicines can be sequentially ejected from a medicine outlet provided in the medicine container. The ejected medicines are fed, for example, to a packaging device.

In the configuration disclosed in Patent Literature 1, when the medicine container is mounted on the support, the fitting member of the medicine container is fitted to the fitting member of the support. This fitting allows a driving force to be transmitted from the support to the medicine container. In the state where the two fitting members cannot be fitted to each other, the end faces of the two fitting members abut each other (in an abutting state). In such an abutting state, the fitting member on the medicine container side rotates due to vibration or the like even if no driving force is transmitted from the support. Then, the rotor rotates and the medicines are ejected from the medicine container when the medicines should not be ejected. This is a problem because the medicines cannot be fed as prescribed.

CITATION LIST

Patent Literature

Patent Literature 1: JP 2012-120719 A

SUMMARY

Technical Problem

Therefore, it is an object of the present invention to provide a medicine feeding unit capable of suppressing ejection of the medicines from the container when the medicines should not be ejected.

Solution to Problem

The present invention is a medicine feeding unit configured to feed solid medicines, the unit including: a medicine feeder having a medicine container configured to contain the medicines and a driven shaft provided rotatably to the medicine container, the medicine feeder being configured to feed the medicines from the medicine container by the driven shaft being rotationally driven; and a support having a rotary drive source and a driving shaft that is connected coaxially with the driven shaft and that is rotationally driven by the rotary drive source, the support being configured to detachably support the medicine feeder, wherein the driven shaft has a driven shaft body and a driven engagement member that is movable in the axial direction relative to the driven shaft body, the driving shaft has a driving shaft body and a driving engagement member that is fixed to the driving shaft body and that is engaged with the driven engagement member, the driven engagement member is biased in an approaching direction approaching the driving engagement member, and the medicine feeding unit further includes a rotation preventing part configured to allow the driven engagement member to rotate in an engaged state in which the driven engagement member is engaged with the driving engagement member, and to prevent the driven engagement member from rotating in an abutting state in which the driven engagement member abuts the driving engagement member without being engaged therewith, in a mounted state in which the medicine feeder is mounted on the support.

Further, the rotation preventing part can have a movable locking part provided in the driven engagement member, and a fixed locking part that is provided in the medicine container and is arranged to be spaced apart from the movable locking part in the engaged state and to lock the movable locking part in the abutting state.

Further, the configuration can be such that the medicine container is provided with a recess in which the driven engagement member is located, the movable locking part is provided in an outer circumferential portion of the driven engagement member, and the fixed locking part is provided in an inner circumferential portion of the recess of the medicine container.

DESCRIPTION OF EMBODIMENTS

Next, the present invention is described with reference to an embodiment of a medicine feeding unit. In the following descriptions for directions of a tablet cassette 1, the side close to a user or the like is referred to as "front side", and the far side thereof is referred to as "rear side", when the medicine feeding unit is seen by the user or the like. Further, the direction in which the medicine feeding unit is seen as above from the user or the like is referred to as "front-back direction", and the left-right direction as seen from the user or the like is referred to as "left-right direction". Further, by likening a rotational direction R of a rotor 16 to a flow, the rotation departure side of the rotational direction R (the back side in the rotational direction) is referred to as "upstream side", and the rotation destination side thereof (the front side in the rotational direction) is referred to as "downstream side".

Figure 1:
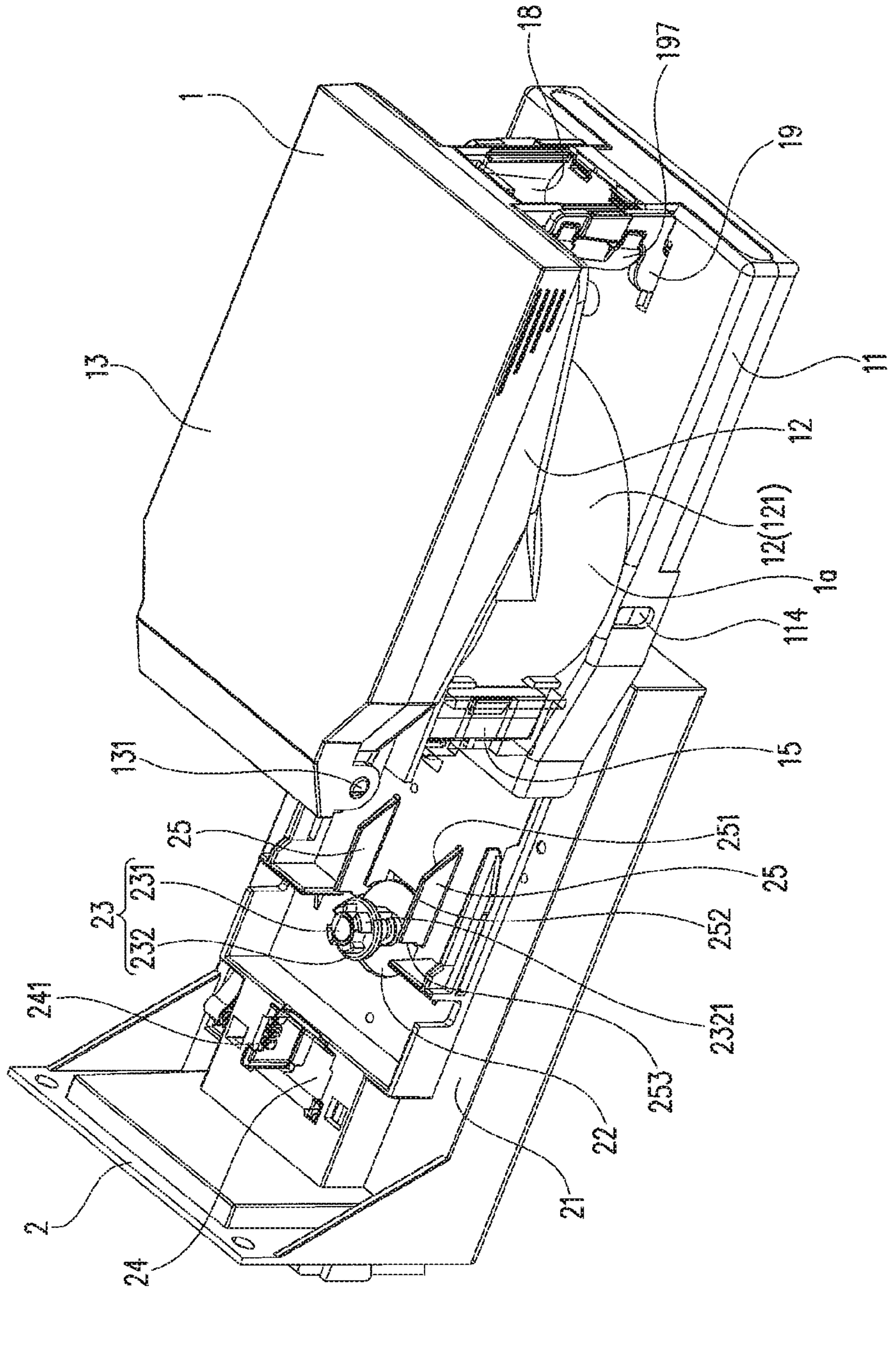
FIG. 1 is a perspective plan view showing a tablet cassette and a support base of a medicine feeding unit according to an embodiment of the present invention.
Figure 2:
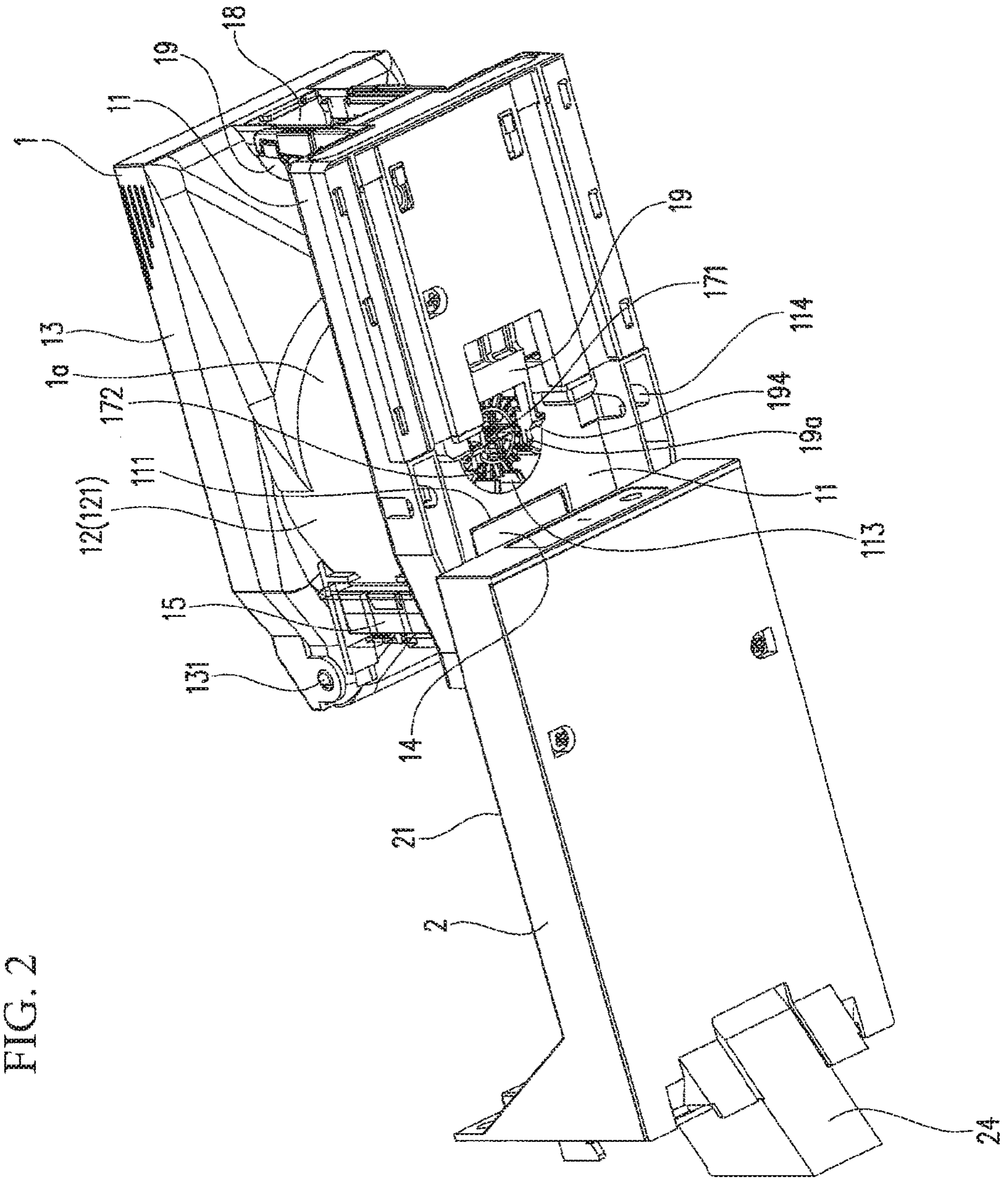
FIG. 2 is a perspective bottom view showing the tablet cassette and the support base of the medicine feeding unit.
Figure 3:
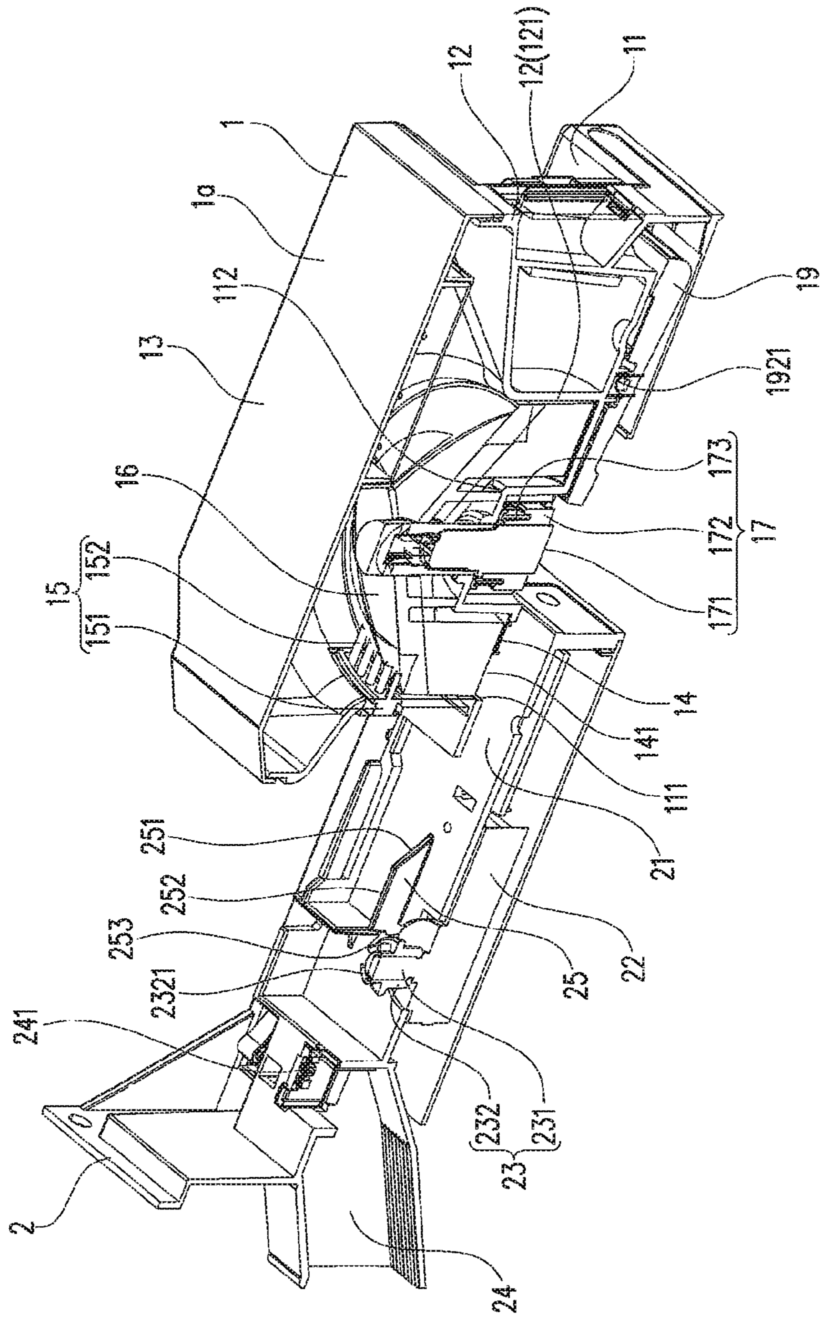
FIG. 3 is a perspective vertical sectional plan view showing the tablet cassette and the support base of the medicine feeding unit.

As shown in FIG. 1 to FIG. 3, the medicine feeding unit includes the tablet cassette 1 serving as a medicine feeder configured to feed tablets M having an elongated shape, and a support base 2 serving as a support constituting a part of the body of the medicine feeding unit.

Figure 4:
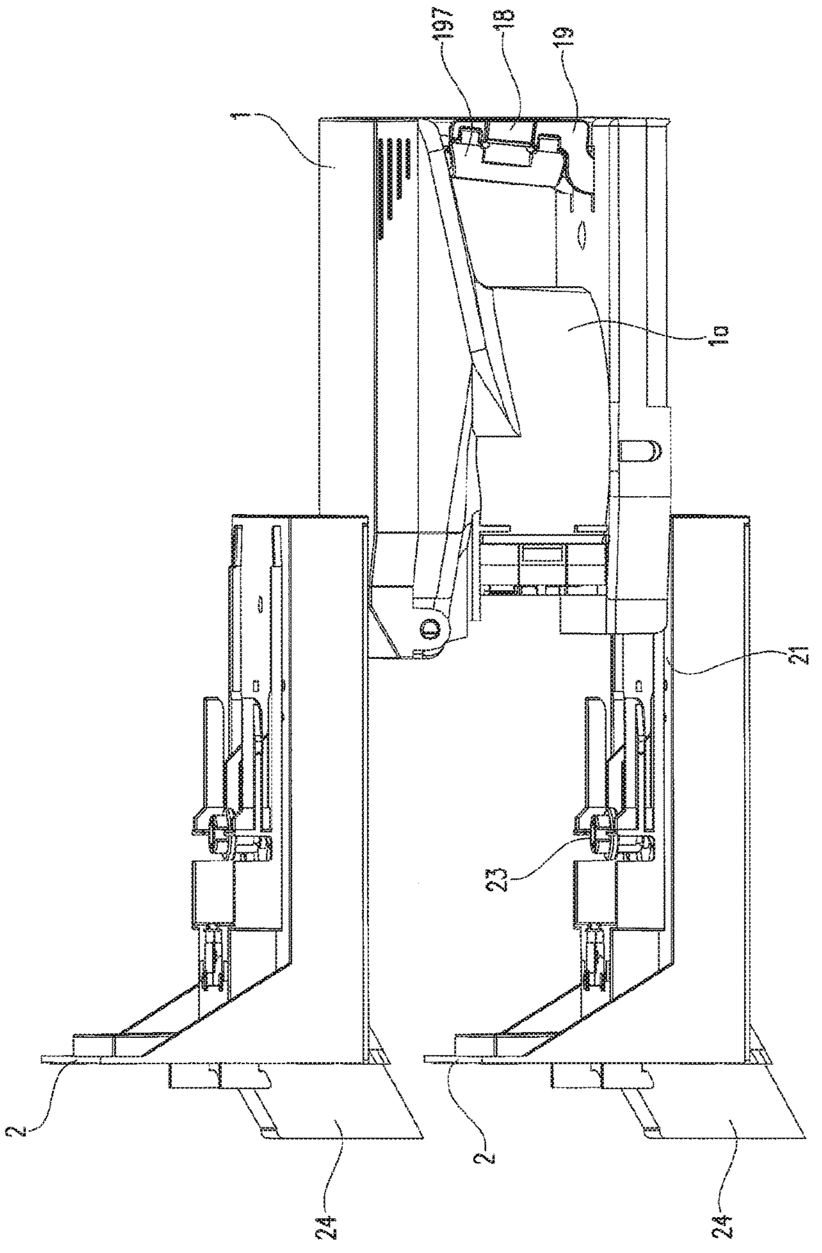
FIG. 4 is a perspective view showing the stacked state of the tablet cassette and the support base of the medicine feeding unit.

In the medicine feeding unit, a plurality of support bases 2 are arranged in the vertical direction, and the tablet cassette 1 is arranged above each of the support bases 2, for example, as shown in FIG. 4 (only the tablet cassette 1 on the lower side is shown in FIG. 4). Therefore, a plurality of medicine feeding units are arranged in alignment in the vertical direction. In the manner as shown in FIG. 4, the medicine feeding units are in the form of a shelf in which a plurality of tablet cassettes 1 can be stacked vertically and horizontally as seen from the front or rear. The medicine feeding units of this embodiment are in the form of a shelf linearly extending in the left-right direction. However, there is no limitation to this, and it also can be in the form of a cylindrical or semi-cylindrical shelf, for example, by extending in the left-right direction to be curved to a constant curvature.

The tablet cassette 1 includes a medicine container 1*a* in the form of a box formed using a synthetic resin or the like. As shown in FIG. 3, the tablet cassette 1 further includes a driven shaft 17 that is provided rotatably with respect to the medicine container 1*a*, and medicines can be fed from the medicine container 1*a* by rotationally driving the driven shaft 17. Therefore, a plurality of tablets M contained in the medicine container 1*a* can be appropriately taken out therefrom. The tablets M contained in the medicine container 1*a* of this embodiment are capsules with an elongated shape (see FIG. 9). However, the object to be contained in the medicine container 1*a* may be solid medicines with various shapes (the shape is not limited to the elongated shape). The tablet cassette 1 including the medicine container 1*a* can be attached or detached by sliding back and forth with respect to the support base 2 that is fixed to the body of the medicine feeding unit. More specifically, it can be attached or detached by sliding with respect to a sliding surface 21 that is the upper surface of the support base 2 intersecting the axial direction of a driving shaft 23.

The "elongated shape" of the tablets M indicates a shape in which, as compared with a sectional dimension (minor axis dimension) in a first direction, a sectional dimension (major axis dimension) in a second direction intersecting the first direction is larger. It is typified by the shape of capsules (in which the sectional shape is oblong). However, the tablets M to be contained in the medicine container 1*a* are not limited to capsules, and include elongated tablets without using capsules. Further, in the case where the action of "moving over", which will be described below, is not needed, circular tablets also can be contained in the medicine container 1*a*.

As shown in FIG. 1 and FIG. 2, the medicine container 1*a* has a bottom part 11, and side walls 12 that are raised upwardly from the bottom part 11. Above the side walls 12, a cover part 13 is attached openably and closably. The cover part 13 of this embodiment is supported by hinges 131 located on the rear side so as to be pivotable with respect to the side walls 12 or the like. Further, maintenance holes 114 are formed on the side surfaces of the bottom part 11. Tools such as a driver can be inserted through the maintenance holes 114.

Further, as a part of the side walls 12, a cylindrical part 121 having an inner circumferential surface with a slightly larger diameter than the outer diameter of the rotor 16 is formed. As shown in FIG. 3, the rotor 16 serving as a medicine delivering part is located inside the medicine container 1*a*, specifically, inside the cylindrical part 121.

A medicine outlet 111 configured to eject the tablets M from the medicine container 1*a* is formed in a portion of the bottom part 11 that is surrounded by the cylindrical part 121 (more specifically, a portion adjacent to the inner circumferential surface of the cylindrical part 121). In this embodiment, a disk-shaped body 14 made of a stainless steel plate or the like is arranged on the upper surface of the bottom part 11. A cutout 141 through which the tablets M dropped from the rotor 16 pass is formed at one point in the outer circumferential portion of the disk-shaped body 14. The cutout 141 is formed with a slightly larger dimension in the circumferential direction than that of temporary medicine containers 164 of the rotor 16. The disk-shaped body 14 is a member capable of closing a region of the medicine outlet 111 that is unnecessary for dropping the tablets M. Depending on the tablets M, there are tablets that make an undesired motion when being dropped from the medicine outlet 111. Use of the disk-shaped body 14 can narrow the region through which the tablets M fall, and can reduce the undesired motion of the tablets M. The end edge of the cutout 141 may have a sharp cut surface or remain having burrs if the cut stainless steel plate or the like is left as it is. Therefore, the tablets M passing through the cutout 141 may possibly be damaged. Accordingly, the end edge of the cutout 141 desirably has a shape, for example, such that the end edge is folded downward without leaving the cut end edge as it is, as described above.

Figure 7:
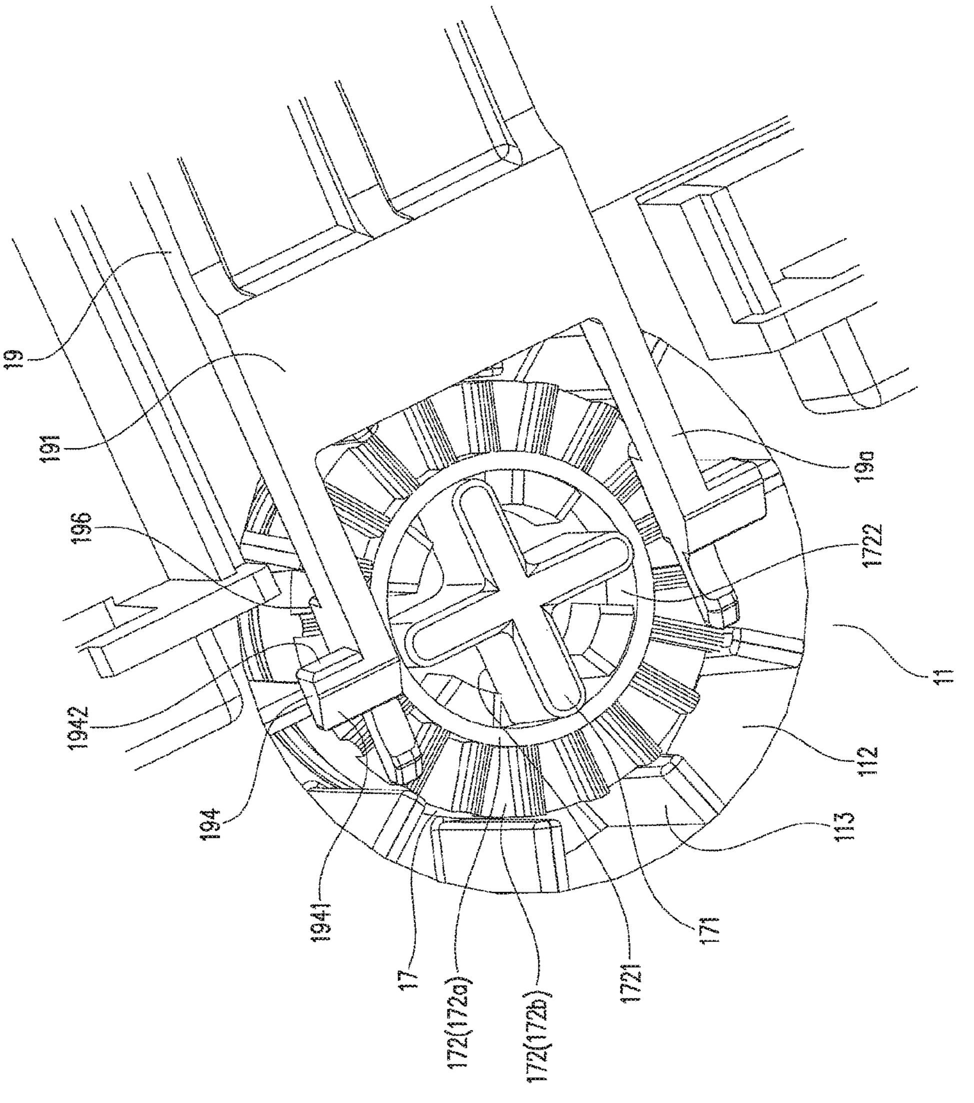
FIG. 7 is an enlarged perspective bottom view of a main part of the tablet cassette of the medicine feeding unit.
Figure 8:
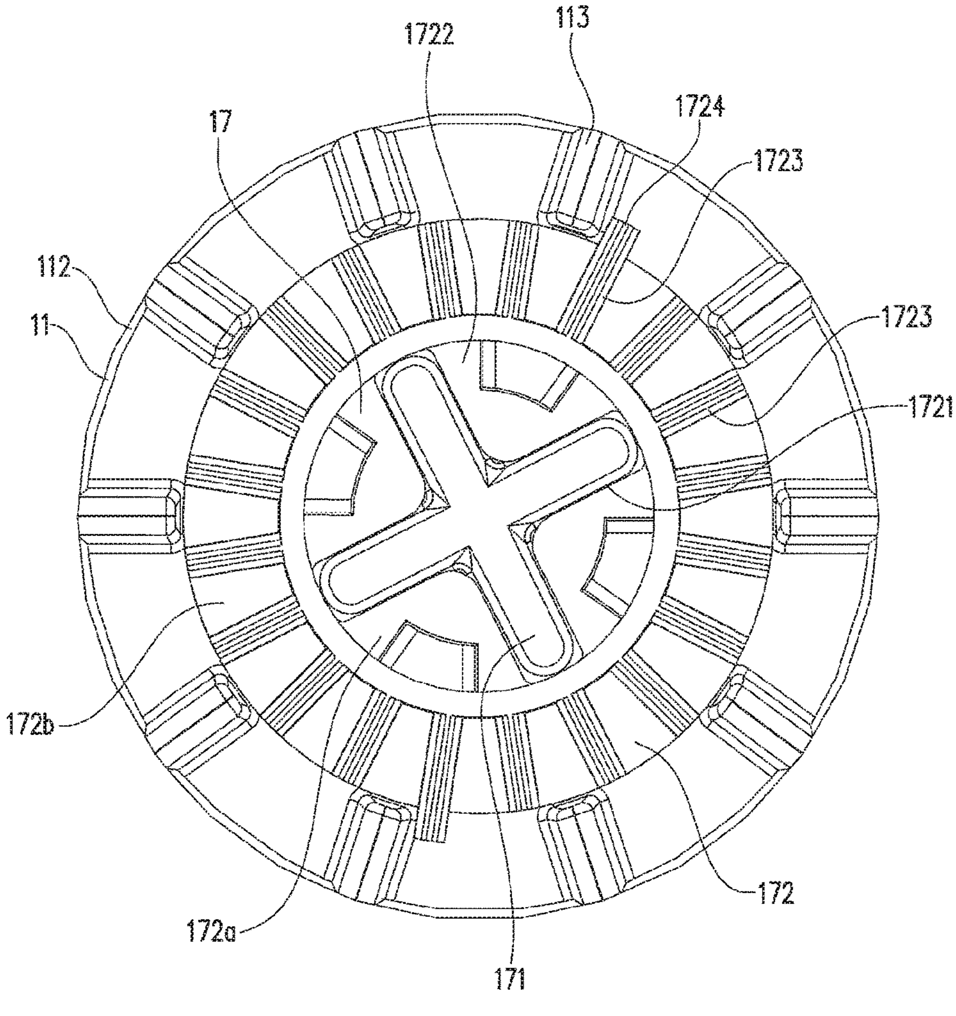
FIG. 8 is an enlarged bottom view of a main part of the tablet cassette of the medicine feeding unit.

As shown in FIG. 3, the bottom part 11 is bent upwardly around the center in the radial direction of the rotor 16, thereby forming a bottom recess 112 opening downwardly. In the bottom recess 112, a driven engagement block (driven engagement member) 172 and a bias spring 173 of the driven shaft 17 are located. Further, as shown in FIG. 7 and FIG. 8, hook projections 113 project from the inner circumferential surface of the bottom recess 112. A plurality (10 in this embodiment) of hook projections 113 are evenly located in the circumferential direction. In two of the recesses (at 10 points in this embodiment) interposed between the hook projections 113, projecting portions 1724 formed projecting in the radially outward direction from plate parts 1723 (which will be described below) formed in the driven engagement block 172 are located. As shown in FIG. 8, with the rotation of the rotor 16, the projecting portions 1724 abut the hook projections 113. As described below, in a rotation preventing part in an unengaged state, the projecting portions 1724 function as movable locking parts, and the hook projections 113 function as fixed locking parts. Therefore, in the state where the driven engagement block 172 abuts driving engagement blocks 232 of the driving shaft 23 of the support base 2 but is not engaged therewith when the tablet cassette 1 is arranged above the support base 2, so that a rotational driving force cannot be transmitted (abutting state), it is possible to suppress the ejection of the tablets M from the tablet cassette 1 when the medicines should not be ejected by rotation of the rotor 16, which may be caused by rotation of the driven shaft 17 due to the influence of vibration or the like even when no driving force is transmitted from the support base 2.

The angles, with reference to the axial center of the driven shaft 17, corresponding to the intervals at which the plurality of recesses (at 10 points in this embodiment) are formed in the circumferential direction are smaller than the angles, with reference to the axial center of the driven shaft 17, corresponding to the intervals at which temporary medicine containers 164 (at 7 points in this embodiment) of the rotor 16 are formed in the circumferential direction. Therefore, even if the driven shaft 17 rotates in the range between two adjacent hook projections 113, the temporary medicine containers 164 of the rotor 16 do not coincide with the medicine outlet 111. Therefore, the ejection of the tablets M due to the influence of vibration or the like can be effectively suppressed.

Further, as shown in FIG. 3, a partition body 15 is located at a position on the rear side of the cylindrical part 121 of the medicine container 1*a*, above the medicine outlet 111, and above the position at which one of the temporary medicine containers 164 of the rotor 16 is formed. In this embodiment, the partition body 15 is spaced from the upper end position of a slope part 1624 of a blocking part 162 of the rotor 16 (see FIG. 9B and others). It is also possible to arrange the partition body 15 so as to be dragged on the slope part 1624 with the rotation of the rotor 16. The partition body 15 prevents two or more tablets M from falling into the medicine outlet 111 at one time due to the two or more tablets M entering a medicine receiving space 164*a* of the temporary medicine container 164 of the rotor 16 that has moved to the position overlapping the medicine outlet 111 thereabove. In other words, the partition body 15 functions as a medicine entry preventing part, and covers over one of a plurality of medicine receiving spaces 164*a* of the rotor 16 that coincides with the medicine outlet 111, thereby preventing the tablets M from entering the medicine receiving space 164*a*.

The partition body 15 includes a base part 151 and a flexible part 152. The base part 151 is a portion attached to the cylindrical part 121. The inner surface of the base part 151 is formed to be curved to substantially the same curvature as that of the inner surface of the cylindrical part 121. The flexible part 152 is a portion in contact with the tablets M, is formed extending in the front direction from the base part 151, and is composed of a brush made of a plurality of soft synthetic resins arranged in parallel. Therefore, the flexible part 152 has flexibility. The degree of the flexibility may be such that abrasions, cracks, or the like do not occur in the tablets M moving with the rotation of the rotor 16 within the medicine container 1*a*, and a partition can be formed between the upper and lower parts so that only one tablet M can be positioned in the temporary medicine container 164 of the rotor 16. Accordingly, embodiments of the flexible part 152 are not limited to a brush as in this embodiment, and may be, for example, a plate body made of soft and rigid resin, which can be appropriately modified.

Figure 5A:
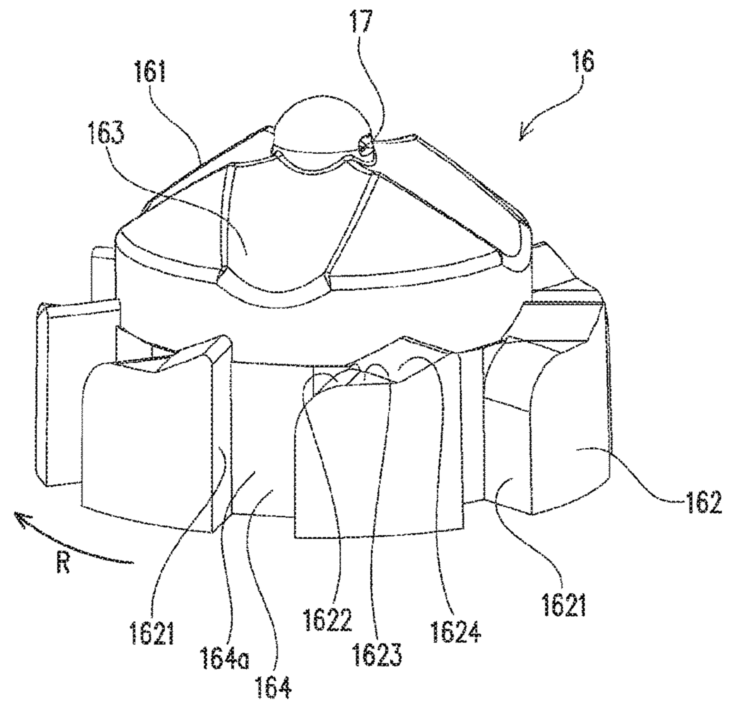
FIG. 5A is a perspective plan view showing a rotor of the medicine feeding unit.

The rotor 16 is located in the cylindrical part 121 so as to be rotatable about an axis intersecting the bottom part 11 (about a vertical axis extending in the vertical direction in this embodiment). In the case of feeding the tablets M, the rotor 16 rotates in the rotational direction R that is the clockwise direction in plan view, as shown in FIG. 5A. It is also possible that it rotates in the direction opposite to the rotational direction R. The rotor 16 includes a body 161 located radially inwardly, and a plurality (7 in this embodiment) of blocking parts 162 projecting in the radially outward direction from the body 161. The body 161 has a shape such that the radially inward position is raised upwardly.

The upper surface of the body 161 forms a slope declining toward the radially outward position. This shape allows the tablets M to slide down on the slope, and thus the tablets M contained in the medicine container 1*a* can be smoothly guided downwardly. In the upper part of the body 161, four recessed grooves 163 extending in the radial direction are formed. The recessed grooves 163 serve to eliminate the distribution deviation of the tablets M within the medicine container 1*a* by moving the tablets M within the medicine container la with the rotation of the rotor 16.

Figure 5B:
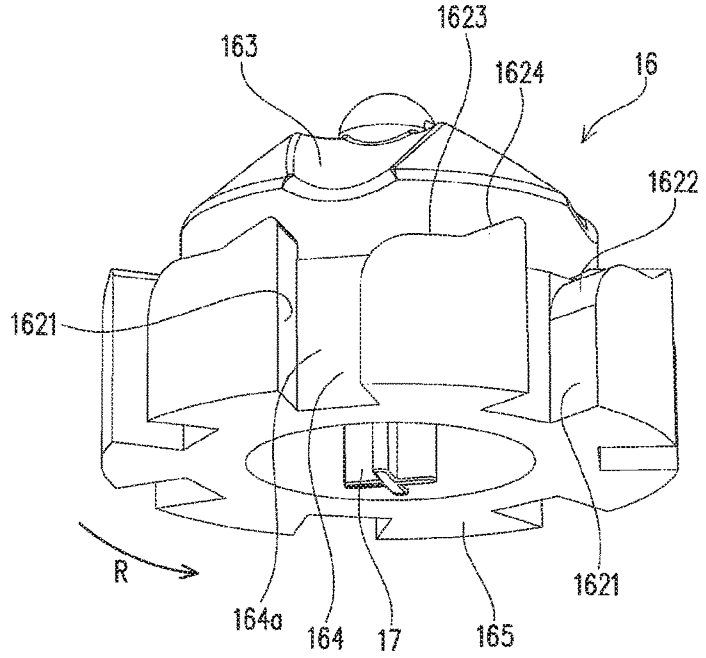
FIG. 5B is a perspective bottom view showing the rotor of the medicine feeding unit.

The plurality of blocking parts 162 are arranged at intervals in the circumferential direction. In this embodiment, the plurality of blocking parts 162 are arranged at equal intervals (angles). The temporary medicine container 164 is a portion having the medicine receiving space 164*a* extending in the vertical direction between two adjacent blocking parts 162. That is, the temporary medicine container 164 is a portion defined by the body 161 and the two blocking parts 162 (more specifically, side walls 1621 of the two blocking parts 162). In other words, a bulkhead portion defining each adjacent medicine receiving spaces 164*a* in the circumferential direction is arranged between the adjacent medicine receiving spaces 164*a*. Such a bulkhead portion corresponds to each of the plurality of blocking parts 162. In this embodiment, the temporary medicine containers 164 are evenly formed at 7 points along the circumferential direction of the rotor 16. The dimension in the circumferential direction of each temporary medicine container 164 is smaller than the major axis dimension of the tablets M. The tablets M with an elongated shape can be contained respectively in the plurality of the medicine receiving spaces 164*a* of the temporary medicine containers 164 one by one in an erected state. Further, as shown in FIG. 5B, a bottom surface 165 is a flat surface. The tablets M contained in the respective medicine receiving spaces 164*a* can be delivered to the medicine outlet 111 by rotationally driving the rotor 16 configured as above.

In each blocking part 162, the side walls 1621 extending in the vertical direction on the upstream side and the downstream side in the rotational direction R, a rounded part 1622 located at an upper corner on the downstream side in the rotational direction R, a flat part 1623 adjacent to the upstream side in the rotational direction R of the rounded part 1622, the slope part 1624 that is adjacent to the upstream side in the rotational direction R of the flat part 1623 and is a slope rising toward the upstream side in the rotational direction R (that is, in the direction opposite to the rotational direction R) are formed. With reference to the end edge of each blocking part 162 on the upstream side in the rotational direction R, the slope part 1624 is a slope declining from the upper end of the end edge on the upstream side toward the downstream side in the rotational direction R. The formation of the slope part 1624 allows each blocking part 162 to have a shape such that the upper end of the end edge on the upstream side in the rotational direction R is located at a relatively high position, and the upper end of the end edge on the downstream side is located at a relatively low position. Further, each blocking part 162 has an upper surface in a portion close to the upstream in the rotational direction R located at a relatively high position, and an upper surface in a portion close to the downstream in the rotational direction R located at a relatively low position.

Figure 9A:
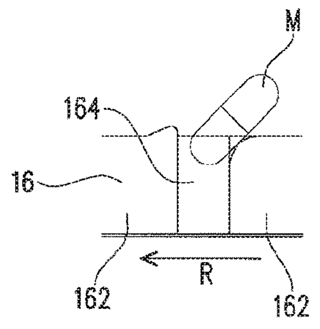
FIG. 9A is a schematic side view sequentially showing the appearance of a tablet moving over a temporary medicine container of the medicine feeding unit.
Figure 9B:
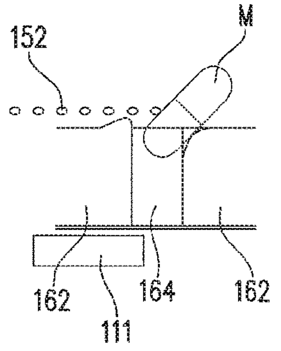
FIG. 9B is a schematic side view sequentially showing the appearance of the tablet moving over the temporary medicine container of the medicine feeding unit.
Figure 9C:
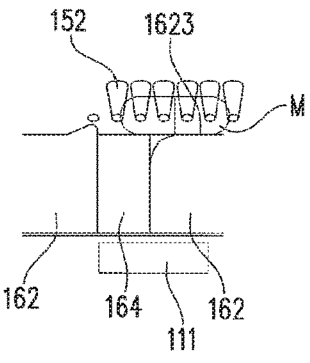
FIG. 9C is a schematic side view sequentially showing the appearance of the tablet moving over the temporary medicine container of the medicine feeding unit.
Figure 9D:
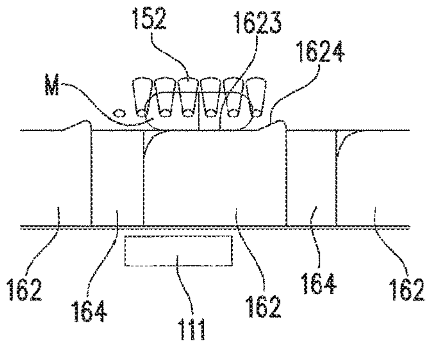
FIG. 9D is a schematic side view sequentially showing the appearance of the tablet moving over the temporary medicine container of the medicine feeding unit.
Figure 9E:
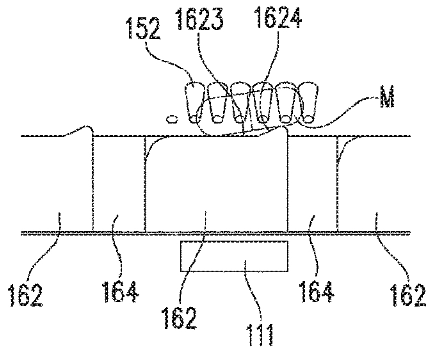
FIG. 9E is a schematic side view sequentially showing the appearance of the tablet moving over the temporary medicine container of the medicine feeding unit.
Figure 9F:
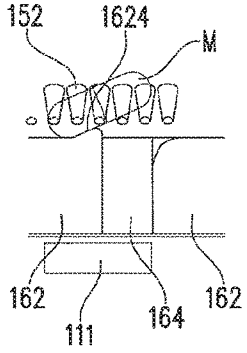
FIG. 9F is a schematic side view sequentially showing the appearance of the tablet moving over the temporary medicine container of the medicine feeding unit.

The inclination of the slope part 1624 needs only to allow the tablets M to face upward toward the upstream in the rotational direction R, as shown in FIG. 9E and FIG. 9F. Therefore, the inclination angle of the slope part 1624 is not specifically limited. Further, the slope part 1624 is a flat surface in this embodiment, but may be a curved surface. For example, it may be formed stepwise with a smaller dimension than the major axis dimension of the tablets M. Further, the slope part 1624 may be formed on the entire upper surface of each blocking part 162 without forming the flat part 1623.

The rounded part 1622 is formed to guide the tablet M located above the rotor 16 to the medicine receiving space 164*a* of the temporary medicine container 164. By allowing the tablet M to move along the rounded part 1622, the tablet M that should enter the temporary medicine container 164 can be smoothly guided to the temporary medicine container 164. The rounded part 1622 of this embodiment is formed as a curved surface with a constant curvature. However, there is no limitation to this, and a curved surface with varying curvature or an inclined flat surface (chamfered part) can be formed at the upper corner on the downstream side in the rotational direction R.

Further, as shown in FIG. 9C to FIG. 9G, the slope part 1624 acts, in the case where the tablet M is caught between the flexible part 152 of the partition body 15 and the blocking part 162, to allow the caught tablet M to move over the temporary medicine container 164 so as not to fall into the temporary medicine container 164.

The "moving over" action is described with reference to FIG. 9A to FIG. 9G. In each figure of FIG. 9, the rotor 16 is moving (rotating) from the right to the left of the figure. First, as shown in FIG. 9A, a part of the tablet M occasionally enters the temporary medicine container 164. Then, when the tablet M in the aforementioned state comes into contact with the flexible part 152 of the partition body 15 (FIG. 9B), the tablet M that is moving to the left of the figure together with the rotor 16 gets under the flexible part 152 and is caught between the flat part 1623 of the rotor 16 and the flexible part 152 (FIG. 9C). With the rotation of the rotor 16, the caught tablet M slides on the flat part 1623 by being pushed by the flexible part 152 from above (FIG. 9D). With reference to the flat part 1623, the sliding direction is to the right of the figure.

Figure 9G:
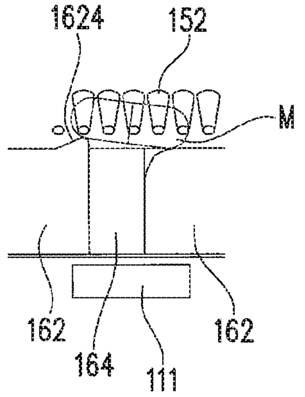
FIG. 9G is a schematic side view sequentially showing the appearance of the tablet moving over the temporary medicine container of the medicine feeding unit.

The sliding tablet M is brought into a state of being right up in the figure by riding over the slope part 1624 (FIG. 9E and FIG. 9F). With such a state, the rotor 16 further rotates, and the tablet M strides over two adjacent blocking parts 162 (FIG. 9G). Then, the tablet M moves over the temporary medicine container 164 without falling into the temporary medicine container 164 located below the striding position.

Figure 11A:
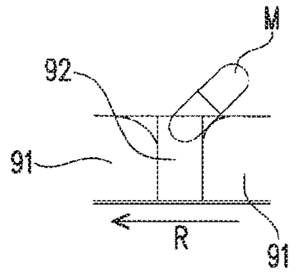
FIG. 11A is a schematic side view showing an inconvenience occurring in a conventional temporary medicine container.
Figure 11B:
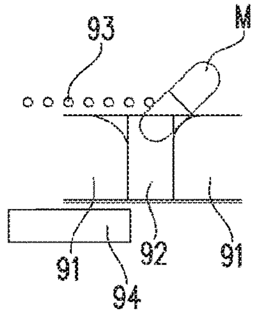
FIG. 11B is a schematic side view showing the inconvenience occurring in the conventional temporary medicine container.
Figure 11C:
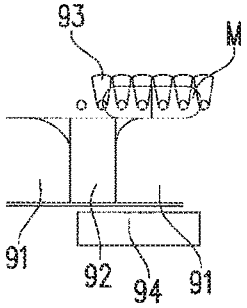
FIG. 11C is a schematic side view showing the inconvenience occurring in the conventional temporary medicine container.
Figure 11D:
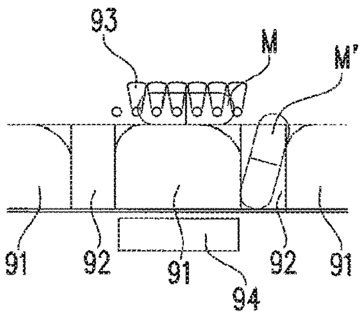
FIG. 11D is a schematic side view showing the inconvenience occurring in the conventional temporary medicine container.
Figure 11E:
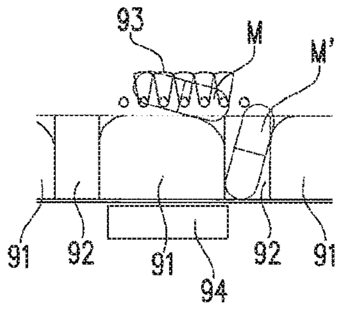
FIG. 11E is a schematic side view showing the inconvenience occurring in the conventional temporary medicine container.
Figure 11F:
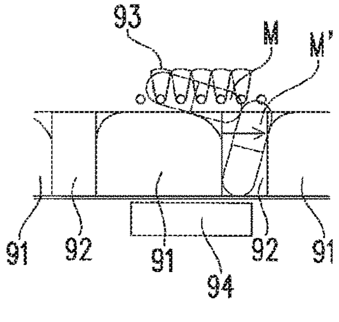
FIG. 11F is a schematic side view showing the inconvenience occurring in the conventional temporary medicine container.
Figure 11G:
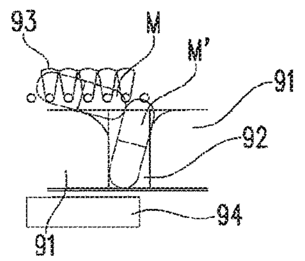
FIG. 11G is a schematic side view showing the inconvenience occurring in the conventional temporary medicine container.
Figure 11H:
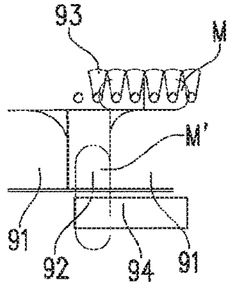
FIG. 11H is a schematic side view showing the inconvenience occurring in the conventional temporary medicine container.
Figure 11I:
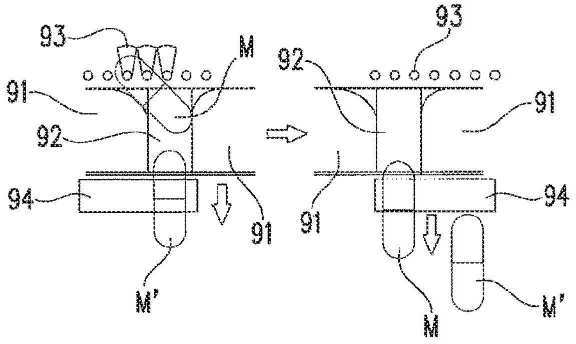
FIG. 11I is a schematic side view showing the inconvenience occurring in the conventional temporary medicine container.

As described above, even if the tablet M is caught between the partition body 15 and the rotor 16, the caught tablet M can be allowed to face the temporary medicine container 164 obliquely upward along the slope part 1624. Therefore, the caught tablet M can be allowed to move over the temporary medicine container 164. Accordingly, the occurrence of inconveniences, such as that the tablet M is caught in the medicine outlet 94, as shown in FIG. 11H, and that two tablets M and M' fall therein at one time, as shown on the right side in FIG. 11I, can be suppressed. In the aforementioned manner, in the medicine feeding unit using the rotor 16 of this embodiment, the tablets M can be fed stably as compared with conventional techniques.

The rotor 16 is coupled to the driven shaft 17 extending downwardly at the center in the radial direction. The rotor 16 is driven to rotate by rotationally driving the driven shaft 17, so that the tablets M can be fed from the medicine container 1*a*. As shown in FIG. 3, the driven shaft 17 includes a driven shaft body 171, the driven engagement block 172 serving as a driven engagement member, and the bias spring 173. The driven engagement block 172 and the bias spring 173 are located so as to be surrounded by the bottom recess 112 of the medicine container 1*a*.

As shown in FIG. 8, the cross sectional shape of the lower part of the driven shaft body 171 is cruciform. On the other hand, a vertical through hole 1721 with a cruciform cross sectional shape is formed in the driven engagement block 172. When the lower part of the driven shaft body 171 is located in the vertical through hole 1721, the driven engagement block 172 is rotatable together with the driven shaft body 171 and is movable in the axial direction, that is, in the vertical direction in this embodiment. Thereby, the driven engagement block 172 can move to advance to or retract from the medicine container 1*a*. Further, the bias spring 173 biases the driven engagement block 172 in the approaching direction close to the driving engagement blocks 232, that is, downwardly in this embodiment. Therefore, the driven engagement block 172 projects from the medicine container 1*a* when the tablet cassette 1 is detached from the support base 2.

The driven engagement block 172 includes driven side engaging parts 1722 together with the vertical through hole 1721 in a radially inward region 172*a* of the lower end surface, as shown in FIG. 7 and FIG. 8. That is, the driven engagement block 172 is a portion including the driven side engaging parts 1722. Four driven side engaging parts 1722 that are recesses formed on the outer circumferential edge in the radially inward region 172*a* to have a specific depth are formed evenly in the circumferential direction. The driven side engaging parts 1722 are engaged with (fitted to) driving side engaging parts 2321 that are projections in the driving shaft 23 of the support base 2. When they are engaged, the axial center of the driven side engaging parts 1722 and the axial center of the driving side engaging parts 2321 are aligned in a straight line. Such engagement allows a rotational driving force to be transmitted from the support base 2 to the tablet cassette 1.

As an example of methods for transmitting the rotational driving force from a support base to a tablet cassette, there has conventionally been a method in which spur gears are meshed from a lateral side (see JP H9-323702 A, for example). However, this method requires an accurate design of the distance between a spur gear on the support base side and a spur gear on the tablet cassette side for ensuring the meshing. In contrast, this embodiment is configured so that the driven side engaging parts 1722 are engaged with the driving side engaging parts 2321 in the vertical direction, and therefore displacement in the vertical direction is acceptable to some extent. Further, in this embodiment, the driving side engaging parts 2321 are designed to be loosely fitted to the driven side engaging parts 1722. Accordingly, displacement is acceptable to some extent also in the front-back direction. Therefore, there is an advantage of being capable of relaxing the design accuracy.

On the other hand, in a radially outward region 172*b* of the lower end surface of the driven engagement block 172, a plurality of plate parts 1723 are formed evenly in the circumferential direction, as shown in FIG. 7 and FIG. 8. Each plate part 1723 is formed extending in the radial direction. When the tablet cassette 1 is detached from the support base 2, the plate parts 1723 are engaged with claw parts 195 of an arm 19 (which will be described below), thereby preventing the rotation of the rotor 16. As described below, in the rotation preventing part in the detached state, the plate parts 1723 function as movable locking parts, and the claw parts 195 function as fixed locking parts. As a configuration for preventing the rotation, the plate parts 1723 are formed in this embodiment. However, there is no limitation to this, and various embodiments such as recesses or projections that can be engaged with the claw parts 195 of the arm 19 can be employed.

Further, in this embodiment, two of the plate parts 1723 project from the outer edge of the radially outward region 172*b* in the further radially outward direction, thereby forming the projecting portions 1724. Here, it is supposed that the driven engagement block 172 abuts the driving engagement blocks 232 of the driving shaft 23 of the support base 2 but is not engaged therewith, so that the rotational driving force cannot be transmitted (in an abutting state, see FIG. 10C). When the rotor 16 rotates by receiving an external force or the like in such an abutting state, the projecting portions 1724 abut the hook projections 113, as shown in FIG. 8, which can suppress ejection of the tablets M from the medicine container 1*a* of the tablet cassette 1 due to further rotation of the rotor 16 when the tablets M should not be ejected.

In this way, the rotation preventing part in an unengaged state is constituted by the projecting portions 1724 and the hook projections 113. The rotation preventing part in an unengaged state allows the rotation of the driven engagement block 172 in an engaged state in which the driven engagement block 172 is engaged with the driving engagement blocks 232 in a mounted state in which the tablet cassette 1 is mounted on the support base 2. On the other hand, it prevents the rotation of the driven engagement block 172 in an abutting state in which the driven engagement block 172 abuts the driving engagement blocks 232 without being engaged. The projecting portions 1724 are movable locking parts provided in the driven engagement block 172 (more specifically, in the outer circumferential portion of the driven engagement block 172). The hook projections 113 are fixed locking parts provided in the bottom part 11 of the medicine container 1*a* (more specifically, in the inner circumferential portion of the bottom recess 112), which are arranged apart from the projecting portions 1724 in the engaged state and are arranged to lock the projecting portions 1724 in the abutting state.

In this embodiment, the projecting portions 1724 are formed at two points, but one projecting portion 1724 may be formed at only one point. However, when the projecting portions 1724 are formed at two points, one of the projecting portions 1724 at the two points that is close to an adjacent hook projection 113 abuts the hook projection 113 earlier, when the rotor 16 rotates, whichever the rotational direction is clockwise or counterclockwise. Therefore, formation of the projecting portions 1724 at two points is advantageous in that an allowable rotation angle of the rotor 16 can be smaller.

As shown in FIG. 1 to FIG. 3, a grip 18 that is a portion gripped by an operator such as a user when the tablet cassette 1 is attached to or detached from the support base 2 is formed on the front side of the medicine container 1*a*. An operation unit 197 of the arm 19 (which will be described below) that is an operating member to be operated to release the unslidable state (locked state) that has been set when the tablet cassette 1 is detached from the support base 2 is located on the rear side of the grip 18.

Figure 6:
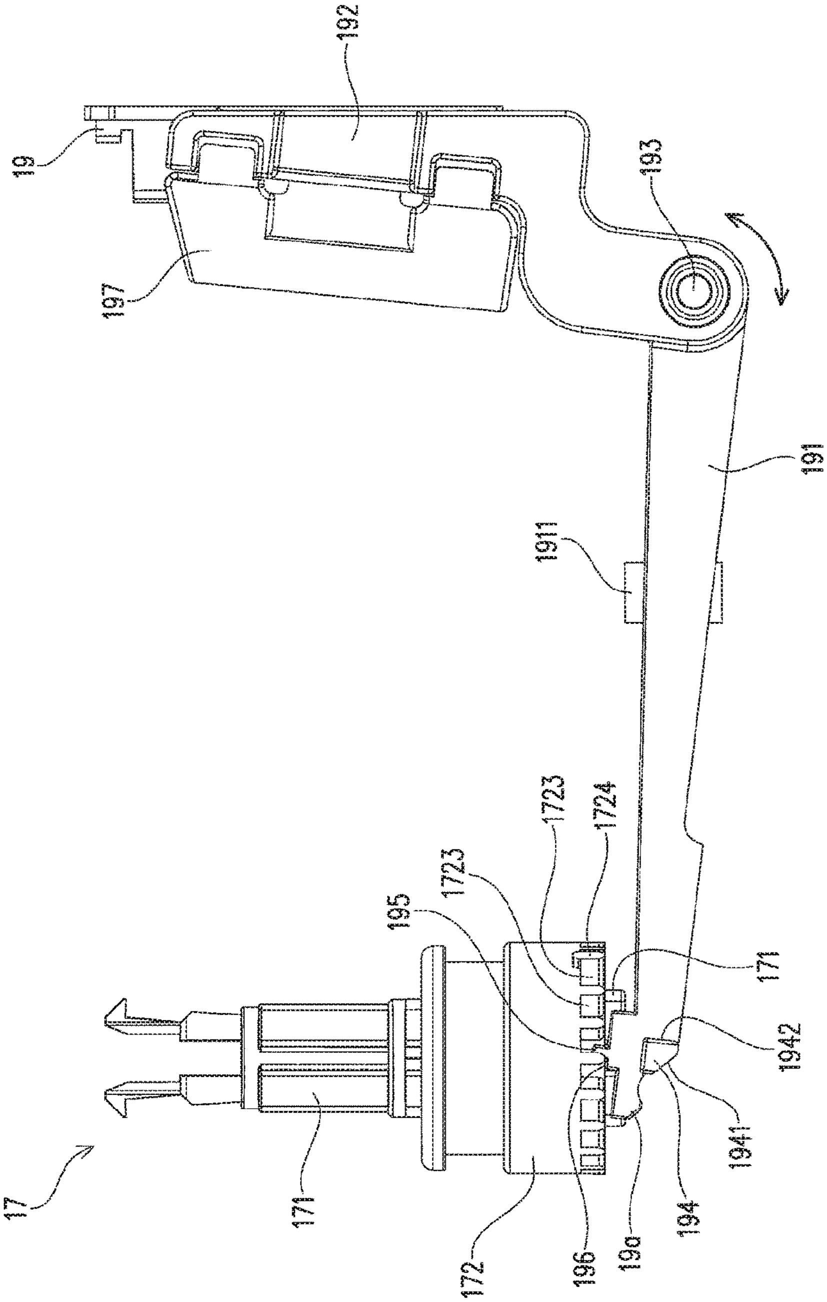
FIG. 6 is an explanatory side view showing the relationship between a lever and a driven shaft of the medicine feeding unit.

The arm 19 has a shape shown in FIG. 6, in which a horizontal part 191 and a vertical part 192 are integrally formed. FIG. 6 is a side view extracting the arm 19, the driven shaft body 171, and the driven engagement block 172, in the state where the driven engagement block 172 is pushed upwardly by the arm 19. The arm 19 is supported by a hinge part 193 located between the horizontal part 191 and the vertical part 192 so as to be pivotable with respect to the bottom part 11 of the medicine container 1*a*. Thus, the arm 19 pivots about the pivot shaft (the axial center of the hinge part 193) parallel to the bottom part 11 within a specific range as shown by the arrow in FIG. 6.

The horizontal part 191 includes a spring mounting portion 1911 at a middle position. Between the spring mounting portion 1911 and the bottom part 11 of the medicine container 1*a*, an arm biasing spring 1921 is attached, as shown in FIG. 3. The horizontal part 191 is biased by the spring 1921 in the counterclockwise direction (downwardly in this embodiment) with the hinge part 193 at the center. The bias direction of the horizontal part 191 by the spring 1921 is the same as the approaching direction in which the driven engagement block 172 approaches the driving engagement blocks 232.

The tip on the rear side of the horizontal part 191 is a pushing part 19*a* capable of pushing the driven engagement block 172 in a separating direction opposite to the approaching direction and is bifurcated to the left and right, as shown in FIG. 2 and FIG. 7. The pushing part 19*a* is also biased in the approaching direction by the spring 1921. In each of the bifurcated portions, a slide regulator 194, a claw part 195, and a push-up surface 196 are formed. The driving shaft 23 of the support base 2 passes through the space between the bifurcated portions, in the state where the tablet cassette 1 is attached to the support base 2.

The slide regulators 194 are projections extending outwardly from the horizontal part 191 to the left and right. Each slide regulator 194 includes a slide abutting surface 1941 and a hooking surface 1942. The slide abutting surface 1941 is formed as a slope facing obliquely downward on the rear side of the slide regulator 194. The hooking surface 1942 is formed as a flat surface facing the front side. The functions of these surfaces will be described later.

As shown in FIG. 6, the claw parts 195 can prevent the rotation of the driven shaft 17 by abutting the plate parts 1723 of the driven engagement block 172. In this way, the claw parts 195 suppress the rotation of the rotor 16 due to an external force or the like, for example, when the tablet cassette 1 is detached from the support base 2, despite that the rotational driving force is not transmitted from the support base 2. Therefore, ejection of the tablets M from the medicine container 1*a* of the tablet cassette 1 when the tablets M should not be ejected can be suppressed.

In this way, the rotation preventing part in the detached state is constituted by the plate parts 1723 and the claw parts 195. The rotation preventing part in the detached state allows the rotation of the driven engagement block 172 in a mounted state in which the tablet cassette 1 is mounted on the support base 2. On the other hand, it prevents the rotation of the driven engagement block 172 in a detached state in which the tablet cassette 1 is detached from the support base 2. The plate parts 1723 are movable locking parts provided in the driven engagement block 172 (more specifically, the end face of the driven engagement block 172, further specifically, the outer circumferential portion of the end face). The claw parts 195 are provided in the bottom part 11 of the medicine container 1*a*. The claw parts 195 are fixed locking parts that are arranged apart from the plate parts 1723 in the mounted state and are arranged to lock the plate parts 1723 in the detached state.

In this embodiment, the claw parts 195 are parts of the arm 19. Accordingly, there is no need to separately provide a stopper for preventing the rotation of the driven shaft 17, and thus the number of parts constituting the tablet cassette 1 can be reduced.

The push-up surfaces 196 function as parts of a retraction mechanism for moving the driven shaft 17 in the axial direction so as not to interfere with the driving shaft 23 of the support base 2 when the tablet cassette 1 is slid. In this embodiment, the retraction mechanism moves the driven engagement block 172 of the driven shaft 17 in a separating direction opposite to the approaching direction, against the biasing force in the approaching direction by the bias spring 173. The push-up surfaces 196 are surfaces for pushing the driven engagement block 172 that is a part of the driven shaft 17 in the separating direction, and the push-up surfaces 196 can push the driven engagement block 172 of the driven shaft 17 upwardly, as shown in FIG. 6.

The vertical part 192 is a portion located in the grip 18 of the tablet cassette 1. The vertical part 192 is provided with the operation unit 197 on the rear side. When a user or the like grasps the grip 18 and moves the operation unit 197 to the front side so as to coincide with the detaching direction of the tablet cassette 1, the arm 19 rotates about the hinge part 193 clockwise in side view. Thereby, the driven engagement block 172 is pushed upwardly by the push-up surfaces 196 of the pushing part 19*a* and moves away from the driving engagement blocks 232 of the support base 2. In addition, the slide regulators 194 can be moved away from projecting walls 25 of the support base 2.

The support base 2 is a member fixed to the body of the medicine feeding unit. The support base 2 includes a motor 22 as a rotational driving source, and the driving shaft 23 that is coaxially connected to the driven shaft 17, that is, with substantially the same axial direction (where the axes are not required to be in a straight line, and an axis deviation is permitted as long as there is no problem in transmission of the driving force) and that is driven to rotate by the motor 22. The two shafts 17 and 23 are connected so that the ends of the two shafts 17 and 23 abut each other, instead of being connected at a radially outward position of the axes as in a conventional method in which spur gears are meshed from a lateral side. The support base 2 detachably supports the tablet cassette 1 by guiding the tablet cassette 1 so as to slide in a direction intersecting the axial direction of the driving shaft 23. In this embodiment, the support base 2 has the sliding surface 21 that is a horizontal plane on its upper surface. With the lower end of the bottom part 11 of the medicine container 1*a* abutting the sliding surface 21, sliding by pushing (in the rear direction) and pulling (in the front direction) is performed. The motor 22 is located below the sliding surface 21, and a driving shaft body 231 extends upwardly from the motor 22 passing through the sliding surface 21.

The driving engagement blocks (driving engagement members) 232 are fixed to the upper end portion of the driving shaft body 231. Each driving engagement block 232 includes a driving side engaging part 2321 in its upper part. That is, the driving engagement block 232 is a portion including the driving side engaging part 2321. The driving side engaging part 2321 is a projection formed projecting from the driving shaft body 231 in the radially outward direction and can be engaged with (fitted to) a driven side engaging part 1722 in the tablet cassette 1. This engagement is achieved by movement of the driving side engaging part 2321 as a projection and the driven side engaging part 1722 as a recess in the axial direction. Therefore, even if the driving side engaging part 2321 and the driven side engaging part 1722 are slightly shifted from each other in the axial direction as compared with the design value, the driving force can be transmitted without problems. Further, in this embodiment, the driving side engaging part 2321 is designed to be loosely fitted to the driven side engaging part 1722. Accordingly, even if the driving shaft 23 and the driven shaft 17 are slightly shifted from each other in a direction orthogonal to the axial direction, the driving force can be transmitted without problems.

Further, a medicine passage part 24 configured to receive the tablet M falling from the medicine outlet 111 of the medicine container 1*a* is formed extending obliquely downwardly on the rear side of the support base 2. A medicine passing sensor 241 is located on a side wall of the medicine passage part 24, so that the falling number of tablets M can be counted by the medicine passing sensor 241.

On the sliding surface 21, two projecting walls 25 are formed extending parallel to each other in the front-back direction. As the upper end face of each projecting wall 25, a guiding slope 251 that is a guiding part for the arm 19 is formed on the front side, which is transformed into a horizontal upper face 252 that is horizontal from the middle. Further, the projecting wall 25 has a rear end face 253 that is a substantially vertical face. The guiding slopes 251 and the horizontal upper faces 252 function as parts of the retraction mechanism for moving the driven shaft 17 in the axial direction so as not to interfere with the driving shaft 23 of the support base 2 when sliding the tablet cassette 1.

Figure 10A:
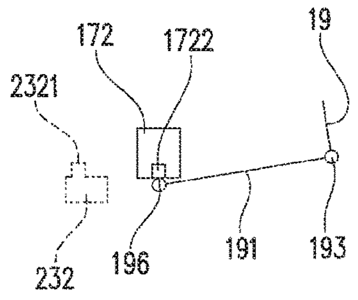
FIG. 10A is a schematic view showing the positional relationship of an arm, a driven engagement block, and a driving engagement block of a medicine feeding unit according to an embodiment of the present invention.
Figure 10B:
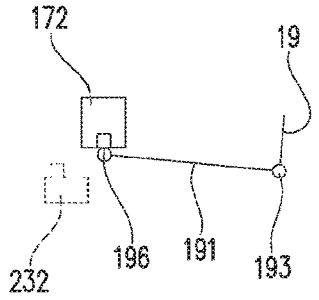
FIG. 10B is a schematic view showing the positional relationship of the arm, the driven engagement block, and the driving engagement block of the medicine feeding unit.
Figure 10C:
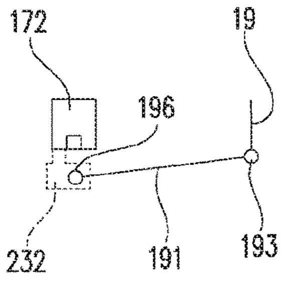
FIG. 10C is a schematic view showing the positional relationship of the arm, the driven engagement block, and the driving engagement block of the medicine feeding unit.
Figure 10D:
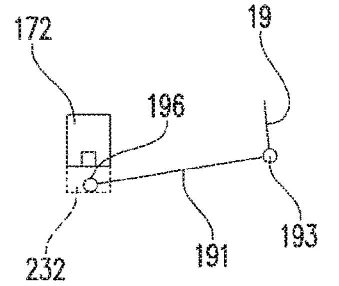
FIG. 10D is a schematic view showing the positional relationship of the arm, the driven engagement block, and the driving engagement block of the medicine feeding unit.
Figure 10E:
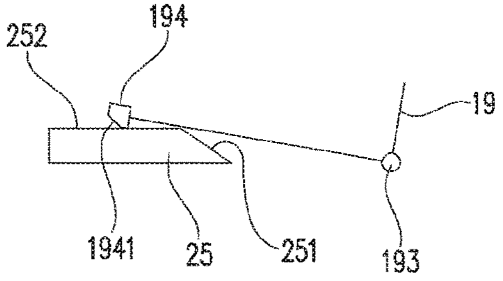
FIG. 10E is a schematic view showing the positional relationship of the arm and a projecting wall of the medicine feeding unit.

The guiding slopes 251 can rotate the arm 19 about the hinge part 193 clockwise in side view by abutting the slide abutting surfaces 1941 of the arm 19 of the tablet cassette 1, when sliding the tablet cassette 1 in a direction pushing it to the rear side, and the horizontal upper faces 252 maintain the state of being rotated clockwise by being abutted by the slide abutting surfaces 1941, until the axial center of the driven shaft 17 coincides with the axial center of the driving shaft 23 (see FIG. 10E). That is, the guiding slopes 251 function as guiding parts for guiding the pushing part 19*a* of the arm 19 in the separating direction when the tablet cassette 1 is mounted on the support base 2 by sliding.

Figure 10F:
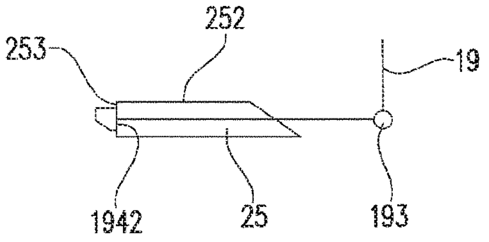
FIG. 10F is a schematic view showing the positional relationship of the arm and the projecting wall of the medicine feeding unit.

Next, the relationship between the arm 19 and the projecting walls 25 is described. When the sliding in the pushing direction is performed, and the tablet cassette 1 is set at a specific position in the support base 2, the slide regulators 194 are located on the rear side of the projecting walls 25 in portions where the projecting walls 25 end (disappear), since the arm 19 is biased downwardly by the arm biasing spring 1921. In this case, when the tablet cassette 1 is about to be slid in the pulling direction to the front side, the hooking surfaces 1942 of the slide regulators 194 abut the rear end faces 253 of the projecting walls 25 (so as to be in a fitted state), as shown in FIG. 10F. This can prevent application of a load to the driving shaft 23 and the driven shaft 17 in a direction orthogonal to the axial direction, and can prevent deformation or the like of the shafts, even if the tablet cassette 1 is pulled to the front side by a user or the like in the state where the engagement between the driven side engaging parts 1722 and the driving side engaging parts 2321 is not released.

When pulling out the tablet cassette 1, a user or the like grasps the grip 18, and moves the operation unit 197 to the front side. This allows the horizontal part 191 of the arm 19 to rotate about the hinge part 193 clockwise. Therefore, the driven engagement block 172 can be pushed upwardly by the push-up surfaces 196, and the slide regulators 194 can be moved above the extended positions of the horizontal upper faces 252 of the projecting walls 25. Thus, the tablet cassette 1 can be pulled out by releasing the engagement between the driven side engaging parts 1722 and the driving side engaging parts 2321 and releasing the fitted state between the hooking surfaces 1942 of the slide regulators 194 and the rear end faces 253 of the projecting walls 25.

When releasing the fitted state, the operation direction of the operation unit 197 by a user or the like is toward the front direction. This direction coincides with the sliding direction when pulling out the tablet cassette 1. Therefore, the operability in pulling is good.

Next, the pushing-up of the driven engagement block 172 by the projecting walls 25 is described. When the tablet cassette 1 is detached from the support base 2, and the slide regulators 194 of the arm 19 are located more on the front side than the projecting walls 25 of the support base 2, the arm 19 is in a state shown in FIG. 10A. As described above, the arm 19 is pushed by the guiding slopes 251 and the horizontal upper faces 252 of the projecting walls 25 to rotate clockwise in side view by sliding of the tablet cassette 1 by a user or the like in the pushing direction to the rear side. With the rotation, the push-up surfaces 196 of the arm 19 push the driven engagement block 172 upwardly into a state shown in FIG. 10B. This state corresponds to the state of FIG. 10E showing the relationship between the arm 19 and the projecting walls 25. By being pushed upwardly as above, the lower end of the driven engagement block 172 is located above the upper ends of the driving engagement blocks 232 of the support base 2 (as shown by dashed lines in the figure). Therefore, the driven engagement block 172 can be located above the driving engagement blocks 232 without interference, as shown in FIG. 10C and FIG. 10D. The state from the state of FIG. 10B to the state of FIG. 10C and FIG. 10D corresponds to the state of FIG. 10F showing the relationship between the arm 19 and the projecting walls 25.

FIG. 10C shows a state where the driven engagement block 172 abuts the driving engagement blocks 232 of the driving shaft 23 of the support base 2 but the engagement between the driven side engaging parts 1722 and the driving side engaging parts 2321 is not achieved because the positions in the circumferential direction of the projections and the recesses do not match each other, so that the rotational driving force cannot be transmitted (abutting state). As described above, the driven shaft 17 is prevented from pivoting by the projecting portions 1724 and the hook projections 113 in the abutting state. The claw parts 195 are spaced apart from the plate parts 1723, so that the engagement between the claw parts 195 and the plate parts 1723 is released in the abutting state.

When the motor 22 of the support base 2 starts rotational driving, the driving engagement blocks 232 rotate and the driven engagement block 172 is lowered, so that the positions in the circumferential direction of the projections and the recesses match each other. Thereby, the driven side engaging parts 1722 and the driving side engaging parts 2321 are engaged with each other so that the abutting state is eliminated, so as to be in the engaged state shown in FIG. 10D. In the engaged state, the driving force can be transmitted from the support base 2 to the tablet cassette 1. The rotation of the driven shaft 17 is allowed in the engaged state, because the projecting portions 1724 (at a low position) do not abut the hook projections 113 (at a high position) due to the driven engagement block 172 being lowered. Also in the engaged state, the claw parts 195 are spaced apart from the plate parts 1723, so that the engagement between the claw parts 195 and the plate parts 1723 is released, as in the abutting state.

As described above, the medicine feeding unit of this embodiment includes the retraction mechanism configured to move the driven shaft 17 in the axial direction so as not to interfere with the driving shaft 23 when sliding the tablet cassette 1. Therefore, there is no need to move the tablet cassette 1 itself in the vertical direction when the tablet cassette 1 is attached to or detached from the support base 2. Accordingly, as shown in FIG. 4, even in the case of arranging a plurality of the support bases 2 in the vertical direction, only a gap with the dimension in the vertical direction of the tablet cassette 1 needs to be ensured between the support bases 2 that are vertically stacked, and thus there is an advantage that the arrangement density of the tablet cassettes 1 can be increased.

Finally, the configuration and action of this embodiment will be summarized. This embodiment is a medicine feeding unit configured to feed tablets (solid medicines) M, the unit including a tablet cassette (medicine feeder) 1 having a medicine container 1*a* configured to contain the tablets M and a driven shaft 17 provided rotatably to the medicine container 1*a*, the tablet cassette 1 being configured to feed the tablets M from the the medicine container 1*a* by the driven shaft 17 being rotationally driven; a support base part (support) 2 having a motor (rotary drive source) 22 and a driving shaft 23 that is connected coaxially with the driven shaft 17 and that is rotationally driven by the motor 22, the support base part (support) 2 being configured to detachably support the tablet cassette 1, wherein the driven shaft 17 has a driven shaft body 171 and a driven engagement block (driven engagement member) 172 that is movable in the axial direction relative to the driven shaft body 171, the driving shaft 23 has a driving shaft body 231 and a driving engagement block (driving engagement member) 232 that is fixed to the driving shaft body 231 and that is engaged with the driven engagement block 172, the driven engagement block 172 is biased in an approaching direction approaching the driving engagement block 232, and the medicine feeding unit further includes a rotation preventing part configured to allow the driven engagement block 172 to rotate in an engaged state in which the driven engagement block 172 is engaged with the driving engagement block 232, and to prevent the driven engagement block 172 from rotating in an abutting state in which the driven engagement block 172 abuts the driving engagement block 232 without being engaged therewith, in a mounted state in which the tablet cassette 1 is mounted on the support base part 2.

According to the aforementioned configuration, the driven engagement block 172 is allowed to rotate in the engaged state in which the driven engagement block 172 is engaged with the driving engagement block 232 in the mounted state in which the tablet cassette 1 is mounted on the support base part 2. Accordingly, the driving force of the motor 22 can be transmitted to the driven shaft 17, so that the tablets M can be fed from the medicine container 1*a*. When the tablets M should not be ejected, the tablets M are not ejected from the medicine container 1*a* by stopping the motor 22. On the other hand, the driven engagement block 172 is prevented from rotating by the rotation preventing part in the abutting state in which the driven engagement block 172 abuts the driving engagement block 232 without being engaged therewith in the mounted state in which the tablet cassette 1 is mounted on the support base part 2. This can suppress ejection of the tablets M from the tablet cassette 1 when the tablets M should not be ejected.

Further, the rotation preventing part can have a projecting portion (movable locking part) 1724 that is a plate part provided in the driven engagement block 172, and a hook projection (fixed locking part) 113 that is provided in the medicine container 1*a* and that is arranged to be spaced apart from the projecting portion 1724 that is the plate part in the engaged state and to lock the projecting portion 1724 that is the plate part in the abutting state.

According to the aforementioned configuration, the rotation of the driven engagement block 172 can be prevented by the hook projection 113 locking the projecting portion 1724 that is the plate part.

Further, the configuration can be such that the medicine container 1*a* is provided with a bottom recess (recess) 112 in which the driven engagement block 172 is located, the projecting portion 1724 that is the plate part is provided in an outer circumferential portion of the driven engagement block 172, and the hook projection 113 is provided in an inner circumferential portion of the bottom recess 112 of the medicine container 1*a*.

According to the aforementioned configuration, the hook projection 113 provided in the inner circumferential portion of the bottom recess 112 of the medicine container 1*a* can lock the projecting portion 1724 that is the plate part provided in the outer circumferential portion of the driven engagement block 172.

An embodiment of the present invention has been described above.

However, the present invention is not limited to the embodiment, and various modifications can be made without departing from the gist of the present invention.

For example, the direction in which the axis of the rotor 16 extends is not limited to the vertical direction, and may be an oblique direction. Further, depending on the circumstances, it may be a horizontal direction. Furthermore, one rotor 16 is provided in the tablet cassette 1 of this embodiment, but a plurality of rotors 16 can be provided per tablet cassette 1. In this case, a plurality of medicine outlets 111 also can be provided. Further, depending on the circumstances, the tablet cassette 1 can be configured to be detachably attached to the support base 2 by being moved in the vertical direction without having the retraction mechanism.

Further, the operating member in the embodiment is configured as the arm 19 that pivots with respect to the bottom part 11 by being supported by the hinge part 193, but there is no limitation to this. That is, it may be configured to move in a direction intersecting the sliding direction, when sliding the tablet cassette 1, in which the distance between the sliding surface 21 and a surface of the tablet cassette 1 that faces the sliding surface 21 increases. The moving direction of the operating member is employed merely using the relationship between the tablet cassette 1 and the support base 2 (the sliding surface 21) in order to specify a direction, and it is not practically essential that the tablet cassette 1 and the support base 2 move away from each other. Further, the operating member can be configured to move parallel to the bottom part 11 of the tablet cassette 1. Furthermore, it can be configured to involve a movement in the front-back direction with respect to the bottom part 11. Moreover, the operating member can be configured to be fixed to the tablet cassette 1 or the support base 2 immovably, and to be capable of moving a part of the driven shaft 17 or the driving shaft 23, for example, when the positional relationship (particularly, the positional relationship in the front-back direction) between the tablet cassette 1 and the support base 2 is changed with sliding.

REFERENCE SIGNS LIST

1: Medicine feeder, Tablet cassette
1*a*: Medicine container
11: Bottom part
111: Medicine outlet
112: Recess, Bottom recess
113: Fixed locking part, Hook projection
15: Medicine entry preventing part, Partition body
16: Medicine delivering part, Rotor
162: Bulkhead portion, Blocking part
1622: Curved surface or inclined flat surface, Rounded part
164: Temporary medicine container
164*a*: Medicine receiving space
17: Driven shaft
171: Driven shaft body
172: Driven engagement member, Driven engagement block
1722: Driven side engaging part
1723: Movable locking part, Plate part
1724: Movable locking part, Projecting portion of plate part
18: Grip
19: Operating member, Arm
19*a*: Pushing part
193: Hinge part
195: Fixed locking part, Claw part
196: Push-up surface
197: Operation unit
2: Support, Support base
21: Sliding surface
22: Rotational driving source, Motor
23: Driving shaft
231: Driving shaft body
232: Driving engagement member, Driving engagement block
2321: Driving side engaging part
25: Projecting wall
251: Guiding part, Guiding slope
M: Solid medicine, Tablet
R: Rotational direction of medicine delivering part, Rotational direction of rotor

The invention claimed is:

1. A medicine feeding unit configured to feed solid medicines, the unit comprising:

a medicine feeder comprising a medicine container configured to contain the medicines and a driven shaft provided rotatably to the medicine container, the medicine feeder being configured to feed the medicines from the medicine container by the driven shaft being rotationally driven; and a support comprising a rotary drive source and a driving shaft that is connected coaxially with the driven shaft and that is rotationally driven by the rotary drive source, the support being configured to detachably support the medicine feeder, wherein the driven shaft comprises a driven shaft body and a driven engagement member that is movable in the axial direction relative to the driven shaft body, wherein the driving shaft comprises a driving shaft body and a driving engagement member that is fixed to the driving shaft body and that is engaged with the driven engagement member, wherein the driven engagement member is biased in an approaching direction approaching the driving engagement member along the axial direction and is engaged with the driving engagement member from the axial direction, the medicine feeding unit further comprises a rotation preventing part configured to allow the driven engagement member to rotate in an engaged state in which the driven engagement member is engaged with the driving engagement member and in a mounted state in which the medicine feeder is mounted on the support, and to prevent the driven engagement member from rotating in an abutting state in which the driven engagement member abuts the driving engagement member without being engaged therewith and in the mounted state in which the medicine feeder is mounted on the support, and the rotation preventing part comprising:

a movable locking part that is provided in the driven engagement member; and a fixed locking part that is provided in the medicine container and that is configured to lock the movable locking part, wherein the movable locking part is spaced apart from the fixed locking part in the engaged state, and wherein, in the abutting state, the movable locking part is locked by the fixed locking part by the movement of the movable locking part in a separating direction opposite to the approaching direction from a position of the movable locking part in the engaged state in which the driven engagement member is engaged with the driving engagement member.

2. The medicine feeding unit according to claim 1, wherein the medicine container is provided with a recess in which the driven engagement member is located, the movable locking part is provided in an outer circumferential portion of the driven engagement member, and the fixed locking part is provided in an inner circumferential portion of the recess of the medicine container.

3. The medicine feeding unit according to claim 1, further comprising an additional rotation preventing part configured to allow the driven engagement member to rotate in a mounted state in which the medicine feeder is mounted on the support, and to prevent the driven engagement member from rotating in a detached state in which the medicine feeder is detached from the support.

4. The medicine feeding unit according to claim 3, wherein the additional rotation preventing part comprises:

a movable locking part provided in the driven engagement member; and a fixed locking part that is provided in the medicine feeder and that locks the movable locking part, so that the fixed locking part locks the movable locking part in the detached state, and the fixed locking part is spaced apart from the movable locking part in the mounted state by the driven engagement member which is moved in a separating direction opposite to the approaching direction from a position of the driven engagement member when the medicine feeder is held in the detached state.

* * * * *